United States Patent [19]
Purvis

[11] 3,726,306
[45] Apr. 10, 1973

[54] REFINERY CONTROL VALVE

[75] Inventor: Howard A. Purvis, Houston, Tex.

[73] Assignee: Texas Alloy Products Co., Inc., Houston, Tex.

[22] Filed: May 20, 1971

[21] Appl. No.: 145,162

[52] U.S. Cl. ............... 137/375, 137/454.6, 251/124, 251/328, 251/329
[51] Int. Cl. ............................................. F16k 27/00
[58] Field of Search ............... 137/375, 454.2, 454.6; 251/123, 368, 328, 329

[56] References Cited

UNITED STATES PATENTS

| | | | |
|---|---|---|---|
| 1,133,650 | 3/1915 | Lentz | 251/124 |
| 2,903,564 | 9/1959 | Carr | 251/368 X |
| 1,986,600 | 1/1935 | Pigott | 251/124 X |
| 2,596,817 | 5/1952 | McGovney | 251/123 |

FOREIGN PATENTS OR APPLICATIONS 911,312   11/1962   Great Britain ..................... 137/454.6

*Primary Examiner*—Harold W. Weakley
*Attorney*—James F. Weiler, Jefferson D. Giller, William A. Stout, Paul L. DeVerter, II, Dudley R. Dobie, Jr. and Henry W. Hope

[57] ABSTRACT

An Improved Refinery Control Valve of the slide or disc type for particular use in fluid catalytic cracking units at high temperatures and velocities with abrasive materials. The entire valve assembly comprising the inlet liner, with port guides and slide, are removable as a unit for repair or replacement, so that the valve body need not be removed from the refinery unit during a turn around.

5 Claims, 4 Drawing Figures

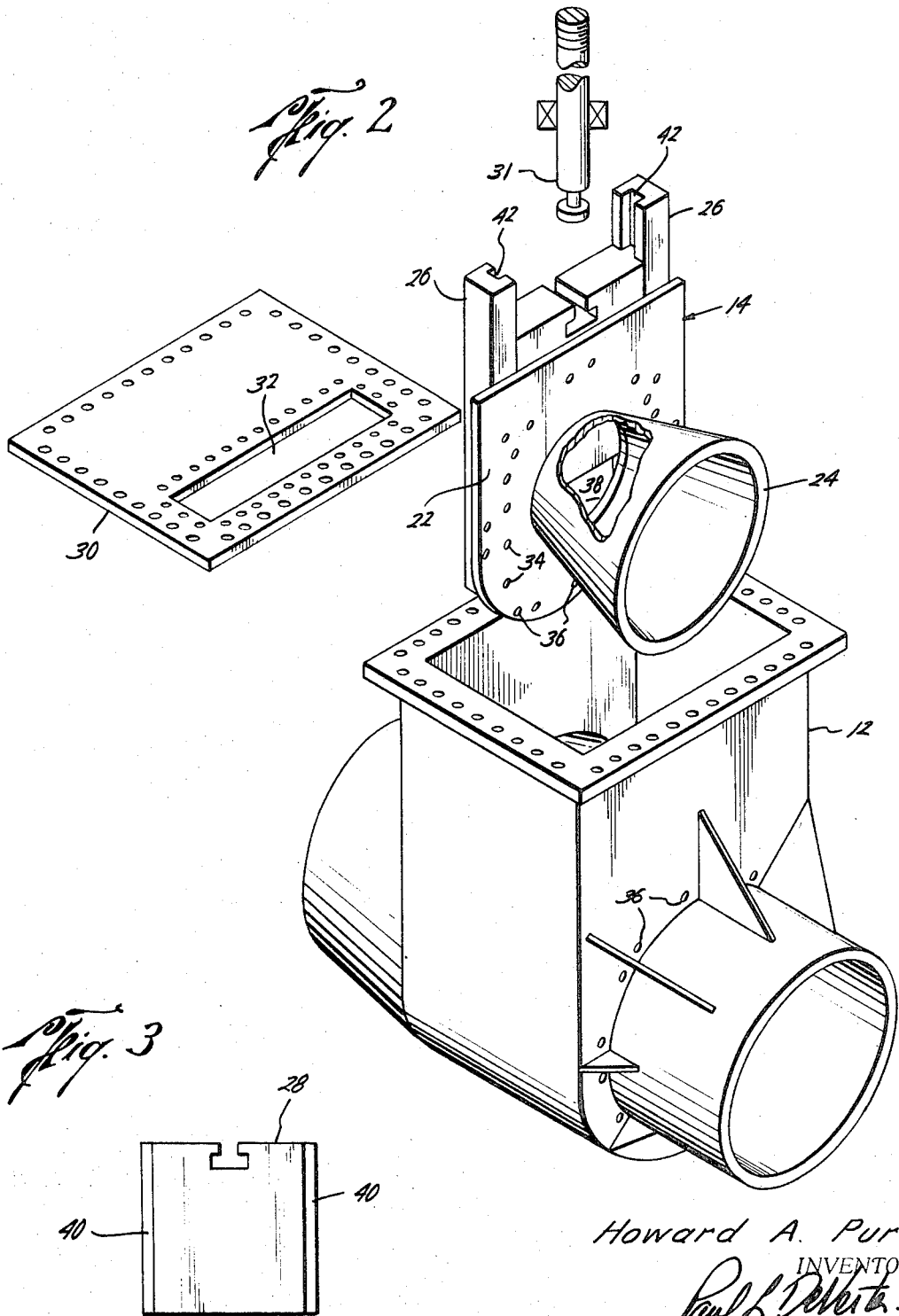

REFINERY CONTROL VALVE

BACKGROUND OF THE INVENTION

The present invention relates to an Improved Refinery Control Valve, and more particularly to such a valve designed for use in abrasive, high temperature service in the fluid catalytic cracking units of oil refineries. The valve is of the slide type wherein the slide is moved across the liner port in order to control the flow through the valve. The valve is not designed to provide a complete seal of the flow of fluid therethrough, but only to control or throttle the flow.

A refinery slide valve controls the operation of the catalytic cracking unit, and it is often the failure of this valve which causes the unit to be shut down for repairs, hence the serviceability and length of life of the refinery slide valve is of great importance. These valves range from about 18 inches to 8 feet in diameter and are bolted to similarly sized pipe.

Present refinery slide valves have the slide guides and a throated liner each individually bolted directly to a seat ring inside of the body of the valve. When operated at refinery temperatures of approximately 1,300°F with the very abrasive catalyst and oil vapors traveling through the unit, the slide and the orifice in the liner are rapidly eaten away, even though hardfaced. To repair the valve, the entire body must be removed from the refinery unit, and shipped long distances by ship, rail, truck or air, and repaired, rehardfaced, remachined, and then be reinserted. Adjustments for wear are made by machining the seat ring, and assembly must be made with precision inside a large body with limited accessibility. Each such valve thereby becomes a tailormade valve without provision for interchangeable parts.

SUMMARY

The present invention provides a set of valve internals which attaches as a unit within the body of the valve. This assembly includes a seat plate, an inlet orifice cone, a pair of guides attached to the seat plate, and a slide mounted in the guides for transverse movement over the plate. Thus, all of the parts subject to erosion are removable from the body as a unit, and may be replaced during a shut-down with a complete new assembly simply by bolting the new assembly within the body, as hereinafter described.

Further, since the valve assembly is made as a unit, distortion of the valve body is of no importance. Repair and tolerance adjustment of the various elements of the valve assembly may be made externally to the valve body with complete accessibility, without requiring the use of unusual precision tools inside the valve body. Advantageously, the valve body does not need to be removed from the flow line when the repair or renewal of parts is necessary, and the machining and remachining of a seat ring in the body is eliminated.

Thus, it is an object of the present invention to provide an Improved Refinery Control Valve wherein the parts of the valve assembly may be removed from the body as a unit for repair or renewal, with the attendant advantages mentioned above.

It is the further object of the present invention to provide an Improved Refinery Control Valve wherein the surfaces subject to erosion may be readily hardfaced and machined without the necessity of removal of the entire valve body.

Other and further objects, features and advantages will be apparent from the examination of the following description of the presently preferred embodiment of the invention given for the purpose of disclosure, when taken in conjunction with the accompanying drawings.

BRIEF DESCRIPTION OF THE DRAWINGS

Like character references designate like parts throughout the several views of the drawings:

FIG. 2 is an exploded view of the valve shown in FIG. 1, partially in section, FIG. 3 is a front view of the slide.

DESCRIPTION OF THE PREFERRED EMBODIMENT

Figure 1:
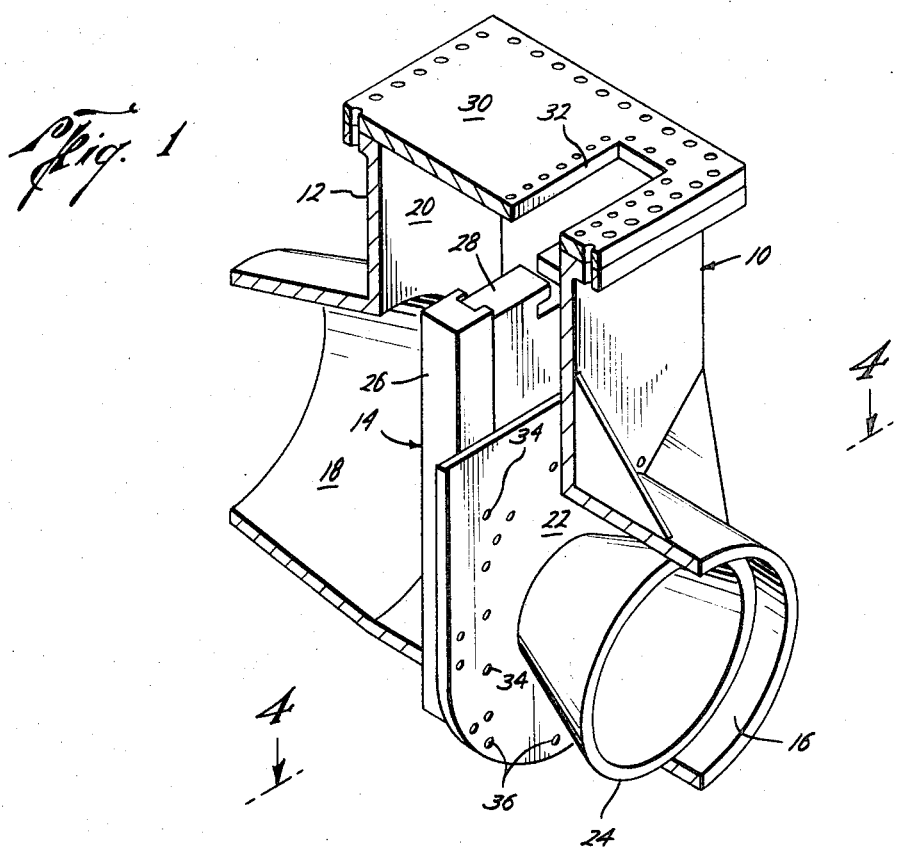
FIG. 1 is a partial sectional prospective view of the assembled valve of the present invention.

Referring now to FIG. 1, the reference numeral 10 generally refers to the control valve which includes the body 12 and the valve assembly 14 mounted therein. The body has an entrance area 16 on the upstream side, an exit area 18 on the downstream side, and a valve area 20 therebetween. The valve assembly 14 is mounted within the body 12 and separates the entrance area 16 from the valve area 20.

The valve assembly 14 includes the seat plate 22 (with the port 38 therein), the orifice cone 24, guides 26 and the slide 28. Mounted on the top of the valve area 20 is the cover 30, which includes an opening 32 through which an actuator rod 31 may be inserted to manipulate the slide 28 and on top of which may be mounted appropriate actuators, stuffing boxes, and other conventional apparatus.

Referring now to FIG. 2, when the cover 30 is removed, it is readily seen that the entire valve assembly 14 may be removed from the body 12 simply by sliding the valve assembly downstream sufficiently to clear the orifice cone 24 out of the upstream portion of the valve body 12, and removing the entire valve assembly 14 outwardly. The orifice cone 24 is suitably attached to the seat plate 22, as by welding, and terminates at the port 38 in the seat plate 22. The guides 26 are attached to the seat plate 22 in a demountable manner, such as with bolts through the holes 34 seen in FIG. 1, and may extend upwardly to the cover 30. The circular series of holes 36, seen in FIG. 2, are utilized to attach the valve assembly 14 within the body 12, adjacent the entrance area 16. The attachment of the seat plate 22 within the body, prevents the flow of vapor and catalyst therearound, except through the port 38. The orifice cone 24 acts as a transition piece from the upstream entrance area 16 to the port 38.

As seen in FIG. 3, the slide 28 is generally rectangular in shape. It acts as a gate in the port 38, seen in FIG. 2. In service, the slide 28 is not generally completely removed from the port 38, but instead is at some intermediate position, to allow for increases and decreases in demand for flow through the valve 10.

Figure 4:
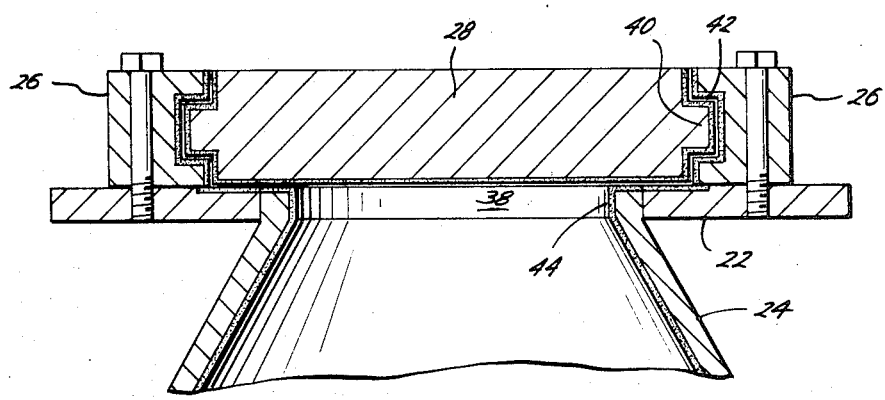
FIG. 4 is a partial sectional view taken along the line 4—4 of FIG. 1.

Each edge of the slide 28 includes a tongue 40. Similarly, the guides 26 include a groove 42 to mate with the tongue 40. As seen in FIG. 4, the tongues and grooves guide the transverse movement of the slide over the port 38. Also to be noted in FIG. 4, is the hardfacing 44 which is applied to the inner edge of the orifice cone 24, as well as to the upstream side of the slide 28, and to the exposed portions of the seat plate 22. Similar hardfacing 44 is also applied to the tongue 40 and to the groove 42 in the slide and in the guides respectively. The purpose of the hardfacing 44 is to combat the erosive effects of the abrasive materials flowing through the control valve 10.

Since the opening of the port 38 is controlled by the position of the slide 28 with respect to the seat plate 22, the clearance between the plate and slide is critical, and approximates 0.030 inches. To achieve this spacing, the guides 26 may be appropriately shimmed from the seat plate 22 prior to insertion of the valve assembly 14 into the body 12. Advantageously, all of this fitting may be done outside of the valve body, instead of inside the valve as is now required with present valves. At the same time, since all of the parts subject to erosion may be removed from the valve body, including the valve seat, it is anticipated that there will be little need to remove the valve body 12 from the refinery unit. Further, since all the valve assembly 14 may be removed from the valve body, precision grinding and fitting of the hardfacing 44 may be readily accomplished. Interchangeability of the complete valve assembly 14 is assured simply by removing the bolts through the holes 36 (which may be done externally), and then substituting an entirely new valve assembly 14, since there are no parts on the body 12 itself subject to rapid erosion.

Thus, it is seen that the present invention has provided an Improved Refinery Control Valve which is particularly useful in controlling high temperature and high velocity abrasive materials in a fluid catalytic cracking unit. The present invention, therefore, is well adapted to carry out the objects and attain the ends and advantages mentioned, as well as others inherent therein. While the presently preferred embodiment of the invention has been given for the purpose of disclosure, numerous changes in the details of construction, and the combination, shape, size and arrangement of parts may be resorted to without departing from the spirit and scope of the invention as hereinafter claimed.

What is claimed is:

1. An improved refinery control valve of the slide type for use with abrasive materials at high temperatures, including
    a body having a valve chamber with an upstream entrance area,
    a valve assembly attachable as a unit within the valve chamber of the body, said valve assembly including,
    an orifice plate having an orifice therein adapted to be attached the body within the valve chamber at its upstream entrance area,
    guides disposed in spaced relation to each other and secured to opposite downstream sides of the orifice plate, each of said guides being spaced away from and out of the path of flow through the orifice,
    a slide,
    interfitting tongues on and grooves in said slide and said guides for sliding the slide in the guides on the orifice plate over the orifice to control flow therethrough, and
    means for sliding the slide within the guides.

2. The invention of claim 1 including:
    an orifice cone mounted on the orifice plate at the orifice projecting upstream into the upstream entrance area,
    the orifice cone forming a transition area of the entrance area to the orifice,
    the valve chamber being open at one end and having sufficient space in the direction of the path of flow for insertion into and removal of the orifice plate, guides, slide and cone from the valve chamber, and
    a removable closure closing the opening to the valve chamber.

3. The invention of claim 2 wherein the inner surfaces of the orifice cone, the mounting surfaces of the interfitting tongues and grooves of the guides and slide, the orifice area of the orifice plate, and the upstream side of the slide are hardfaced.

4. An internal valve assembly for use in the valve chamber of the body of a refinery control valve of the slide type, the assembly including:
    an orifice plate having an orifice therein adapted to be attached to the body in the valve chamber at its upstream entrance area,
    an orifice cone attached to the upstream side of the orifice plate which projects into the upstream entrance area to the valve chamber when the orifice plate is attached as aforesaid,
    guides disposed in spaced relation to each other and secured to opposite downstream sides of the orifice plate, each of said guides being spaced away from and out of the path of flow through the orifice,
    a slide, and
    interfitting tongues on and grooves in said slide and said guides for sliding the slide in the guides on the orifice plate and over the orifice to control flow therethrough,
    the orifice plate, orifice cone, guides and slide being insertable into and removable as a unit from the valve chamber of the body.

5. The invention of claim 4 wherein the inner surfaces of the orifice cone, the mounting surfaces of the interfitting tongues and grooves of the guides and slide, the orifice area of the orifice plate, and the upstream side of the slide are hardfaced.

* * * * *